United States Patent [19]
Blasko

[11] 3,989,198
[45] Nov. 2, 1976

[54] BRUSH CHIPPER AND BRAKE ASSEMBLY USABLE THEREWITH

[75] Inventor: Andrew G. Blasko, Riegelsville, Pa.

[73] Assignee: Asplundh Tree Expert Company, Willow Grove, Pa.

[22] Filed: Apr. 16, 1975

[21] Appl. No.: 568,706

[52] U.S. Cl. .................. 241/101.7; 83/DIG. 1; 188/70 R; 188/161; 192/3 R; 241/36; 241/189 R
[51] Int. Cl.² ........................................ B02C 23/04
[58] Field of Search ............... 83/DIG. 1; 192/3 R; 241/36, 56, 63, 101.7, 189 R; 188/70 R, 70 B, 161

[56] References Cited
UNITED STATES PATENTS

| | | | |
|---|---|---|---|
| 2,605,862 | 8/1952 | Winther | 188/161 X |
| 2,880,942 | 4/1959 | Hall | 241/36 UX |
| 2,981,485 | 4/1961 | Mainone | 241/101.7 X |
| 3,182,917 | 5/1965 | Tamny et al. | 241/36 |
| 3,228,177 | 1/1966 | Coates | 188/70 R X |
| 3,270,968 | 9/1966 | Hess et al. | 241/189 R X |
| 3,290,871 | 12/1966 | Haas | 192/3 R X |
| 3,842,950 | 10/1974 | Fontaine | 192/3 R X |
| 3,874,608 | 4/1975 | Ciriegio | 241/101.7 X |

FOREIGN PATENTS OR APPLICATIONS 973,454 10/1964 United Kingdom ................. 192/3 R Primary Examiner—Granville Y. Custer, Jr.
Assistant Examiner—Howard N. Goldberg
Attorney, Agent, or Firm—John W. Logan, Jr.

[57] ABSTRACT

The preferred embodiment of the invention disclosed herein includes a motor operatively connected to drive a rotatable drum assembly including cutting means rotatable through a cutting station where brush and similar debris is cut into small chips. Adjacent the cutting station is a feed station from which the brush may be hand-fed to the cutting station and at the feed station is actuating means operative to actuate emergency shutoff means and emergency brake means, the former being operative to shut off the motor and the latter being operative to stop the rotation of the drum assembly. Preferably, the emergency brake means includes a band member including a brake lining located about the periphery of a portion of the drum assembly and having spaced apart end portions. One end portion of the band member is fixed to a frame and the other end portion is spring biased away from the drum assembly so that the brake lining is normally not engaged with the adjacent periphery of the drum assembly. The other end portion of the band member is also associated with electromagnets normally spaced from a portion of the drum member. When the actuating means is operative, the electromagnets are energized and grip the drum assembly whereby the energy in the drum assembly causes the brake lining to wrap around the periphery of the drum assembly and exert a braking force thereon.

16 Claims, 6 Drawing Figures

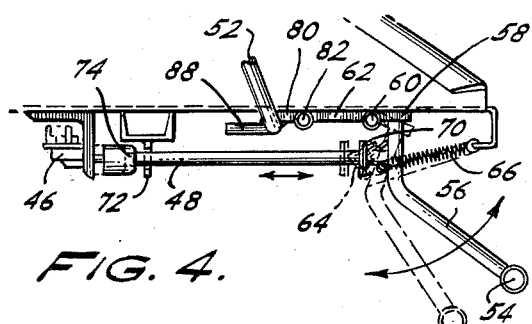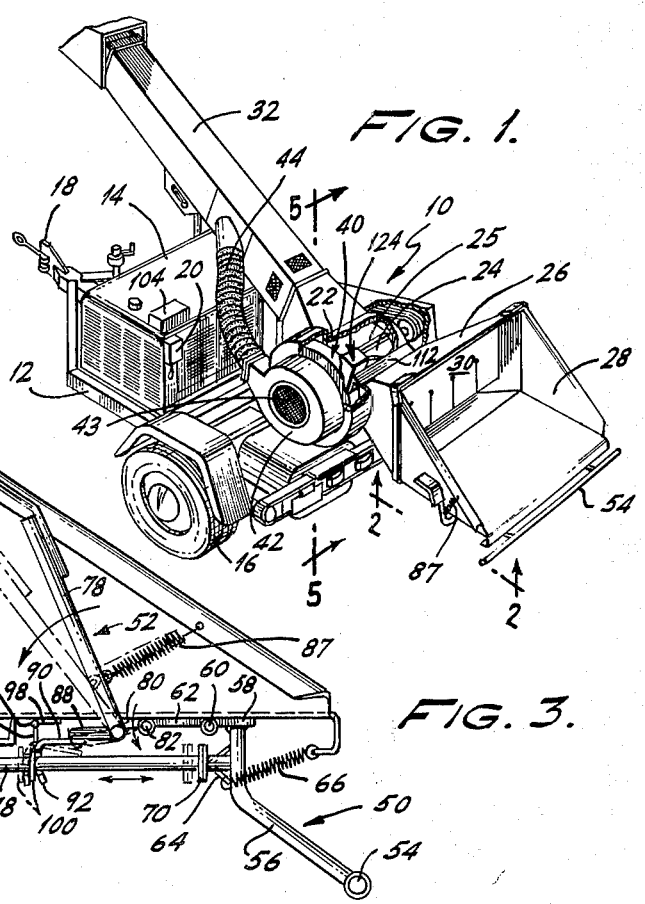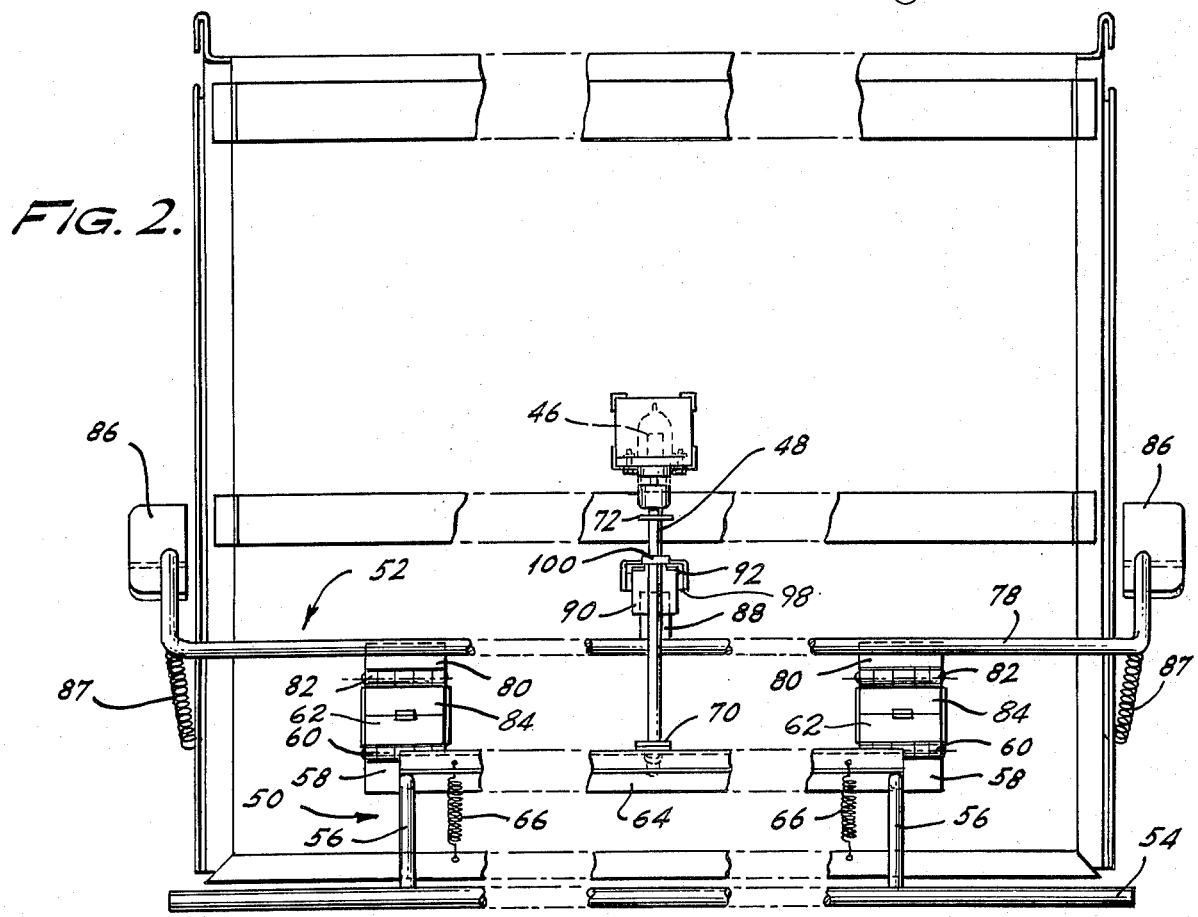

BRUSH CHIPPER AND BRAKE ASSEMBLY USABLE THEREWITH

This invention relates to brush chippers and, more particularly, to brush chippers with emergency brake and shutoff assemblies and also to brake assemblies, and more, particularly to brake assemblies useful as an emergency brake for brush chippers and similar apparatus having a rotating drum.

Certain material which is to be cut or otherwise worked by a motor-driven apparatus is of such a nature that it may include foreign objects which could inadvertently be fed to the apparatus and cause damage. For example, brush and similar debris resulting from land clearing, tree pruning, and similar operations is generally picked from the ground and hand-fed to the brush chipper where it is cut into small chips to reduce its volume. Brush chippers generally include a motor driven rotary drum assembly including cutting blades rotatable through the cutting station where the brush is cut into chips. Since the brush is picked from the ground it may include ax heads, rakes and other rigid objects which, if fed to the cutting station, would cause breakage of the cutting blades, the drum assembly and other elements forming part of the cutting station. Such damage necessitates expensive repair work and further results in costly inactivity of the brush chipper while it is being repaired.

Accordingly, it is one object of this invention to provide apparatus such as a brush chipper that includes means for rapidly stopping the operation of the apparatus and which can be actuated from a position easily accessible to the operator.

It is another object of this invention to provide a brush chipper including means for stopping its operation which means can be actuated from various easily accessible locations.

It is still another object of this invention to provide a brush chipper including a motor driven cutting assembly and means for shutting off the motor and simultaneously applying a braking force to the cutting assembly.

Briefly, these and other objects of this invention are accomplished by providing a brush chipper or the like including a power source operative to drive a rotatable drum assembly including cutting means for cutting brush and similar debris fed from an adjacent feed station into small chips. Emergency shutoff means is provided for discontinuing the output of the power source to the drum assembly and emergency brake means is provided for stopping the rotation of the drum assembly. Both the emergency shutoff means and the emergency brake means are activated by an actuating means located adjacent the feed station. Preferably, the actuating means can be operated from a plurality of easily accessible locations adjacent the feed station and includes a plurality of independent operating means each of which is operative to activate the emergency shutoff means and the emergency brake means.

In accordance with another aspect of this invention it is noted that brush chippers and other apparatus including a rotatable drum assembly are arranged so that the drum assembly is relatively heavy and is driven at a relatively high speed. Because of this arrangement the brake assembly must be capable of providing a relatively large braking force over a relatively short period of time. Of course, the brake assembly should also be relatively simple and inexpensive.

Thus, it is another object of this invention to provide a brake assembly that provides a large braking force over a short period of time and that is relatively simple and inexpensive.

It is yet another object of this invention to provide a brake assembly for rotating drum members that utilizes the energy of the drum member to provide the braking force.

Finally, it is an object of this invention to provide a brake assembly particularly useful as an emergency brake assembly in brush chippers.

These objects and others are accomplished by providing a brake assembly including a brake band member having a brake lining adapted to extend about the periphery of a drum member and which is formed with spaced apart end portions. One end portion of the brake band member is rigidly fixed to an external frame and the other end is connected to a spring such that the brake lining is biased away from and out of engagement with the drum member. The other end of the brake band member includes gripping means, preferably electromagnets normally spaced from the drum member and movable into gripping engagement therewith. When the gripping means engages and grips the drum member the energy in the drum member pulls the other end of brake band member and causes the brake lining to wrap around the periphery of the drum exerting a braking force that stops the rotation of the drum member.

For a better understanding of the invention, reference is made to the following description of a preferred embodiment taken in conjunction with the figures of the accompanying drawing in which:

FIG. 1 is a perspective view of a brush chipper in accordance with this invention with portions thereof broken away for the sake of clarity;

FIG. 2 is a plan view looking in the direction of the arrows on line 2—2 of FIG. 1 and illustrating an actuating mechanism usable in the preferred embodiment of the invention;

FIG. 3 is a side elevational view of a portion of the actuating mechanism illustrated in FIG. 2 showing one mode of operation in phantom lines;

FIG. 4 is a side elevational view with portions omitted for the sake of clarity of the actuating mechanism and is somewhat similar to FIG. 3 except that it illustrates another mode of operation in phantom lines;

Figure 5:
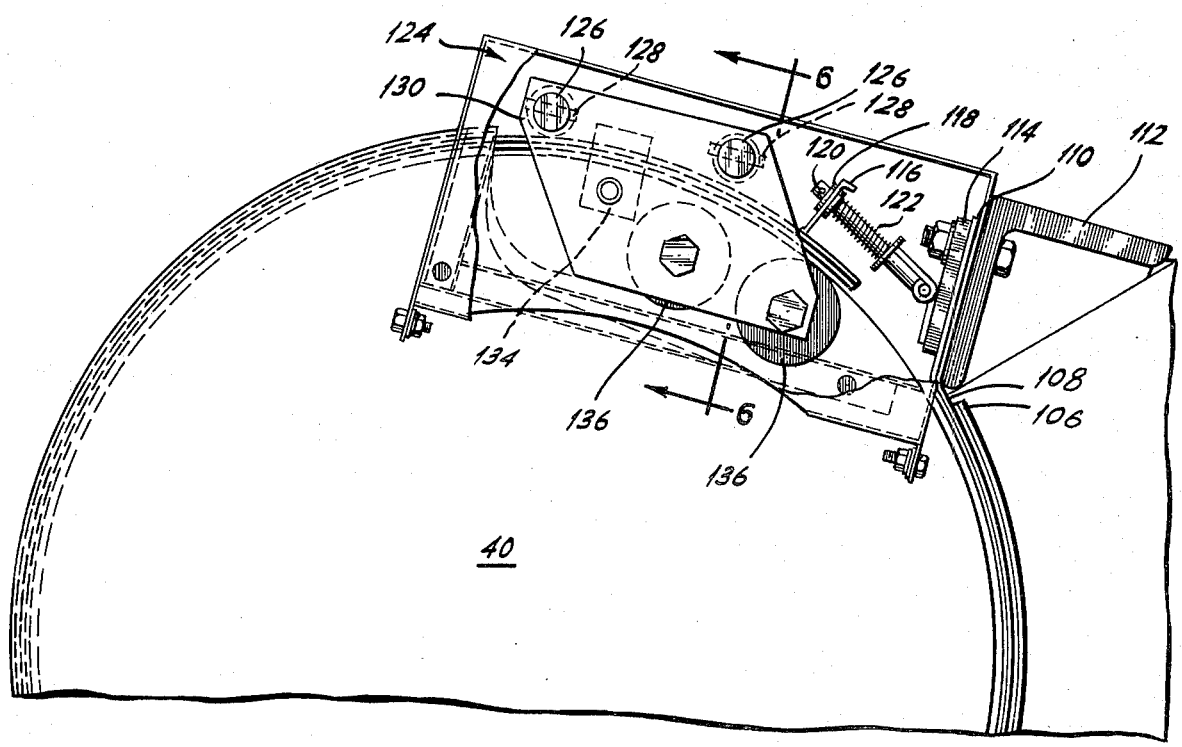
FIG. 5 is a sectional view taken along the line 5—5 of FIG. 1 and illustrating a preferred embodiment of a brake assembly in accordance with this invention; and, FIG. 6 is a sectional view of the brake assembly illustrated in FIG. 5 and taken along the line 6—6 thereof.

Referring to FIG. 1 of the drawing, there is illustrated a preferred embodiment of a brush chipper 10 in accordance with this invention, but it should be understood that the invention is usable in other similar types of apparatus. The brush chipper 10 is mounted on a trailer 12 on which is also mounted a power supply 14 for driving the brush chipper and as is generally conventional, trailer 12 includes wheels 16, only one of which can be seen, and a draw bar 18 so that it may be hitched to the back of a truck and transported with the brush chipper and the power supply from one job site to another. In the embodiment disclosed herein and as is also conventional in the art, the power supply 14 is in the form of a gasoline engine and includes a throttle 20 for controlling the output speed of the engine and, accordingly, the brush chipper 10.

The brush chipper 10 includes an enclosed generally cylindrical housing 22 formed with inlet and outlet openings (not illustrated) and which houses a rotary drum member 24 which passes through a cutting station during its rotation. As is conventional in the art, the cutting station may include a cutter bar rigidly held adjacent the base of the trailer and which is provided with a sharp edge that cooperates with a plurality of cutting blades 25 carried on the drum member 24. The cutting blades cooperate with the cutter bar to cut brush fed through the inlet opening into small chips and discharge the chips through the outlet opening. Communicating with the inlet opening is a feed chute 26 and a feed table 28 on which the brush may be rested while being fed to the cutting station. Since the brush is hand-fed by an operator to the cutting station, a flexible shroud 30 is located over the opening of the feed chute to protect the operator during the feeding operation. Extending upwardly and away from the outlet opening is a discharge chute 32 formed with a discharge opening (not illustrated) for conveying the chips from the brush chipper 10 to an appropriate storage device. If, as is usual, the brush chipper 10 is mounted on a trailer hitched to a truck the storage device can conveniently comprise the enclosed bed of the truck.

Still referring to FIG. 1 of the drawing, it can be seen that the rotary drum member 24 is carried on a shaft, the ends of which project beyond the side surfaces of the drum member. One end of the shaft fixedly carries a sheave arrangement which cooperates with a drive belt arrangement driven by the output shaft of the power supply 14 for driving the drum member 24. At the other end of the shaft there is a flywheel 40 arranged to rotate with the shaft and, thus, the drum member 24. As is clearly explained in the U.S. Patent to Robert E. Pletcher, U.S. Pat. No. 3,944,147, issued Mar. 16, 1976 for Brush Chipper, the flywheel 40 allows the drum member and its associated cutting blades to be rotated at a slower speed to reduce the noise produced by the operation of the brush chipper 10 while assuring that the cutting blades exert sufficient force to form the chips. As also explained in the above-noted co-pending application, an impeller (not illustrated) is rigidly secured to the flywheel 40 and is contained in a blower housing 42 having an air intake opening 43 such that a stream of air is provided through a suitable conduit 44 to the discharge chute 32 to facilitate the conveyance of the chips to the storage container.

As will be fully explained hereinafter, the brush chipper 10 is provided with brake means for applying a braking force to stop the rotation of the drum member 24 and with a shutoff means for stopping the output of the power source 14 to the drum member. Both the brake means and the shutoff means are connected in a circuit with a switch 46 which is operated by an actuating means including an actuating rod 48 slidably mounted on the bottom of the feed table 28. The actuating rod 48 has a first position and a second position where it closes the switch 46 and is movable from the first position to the second position by either of a first operating assembly 50 or a second operating assembly 52 included in the actuating means. The operating assemblies 50 and 52 are so arranged that the actuating rod 48 can be moved from its first to its second position from any of various positions adjacent the feed table 28 where an operator is normally working.

Referring particularly to FIGS. 2–4 of the drawing the first operating assembly 50 can be seen to include an actuating bar 54 extending across the back of the feed table 28 and below the bottom wall thereof and is attached intermediate its ends to a pair of pivot arms 56, 56. Each pivot arm 56 is fixed to a movable hinge plate 58 pivoted about a hinge pin 60 carried on the under side of the bottom wall of the feed table 28. Preferably, another hinge plate 62 is associated with each hingepin 60 and is welded to the underside of the floor of the feed table 28. Extending between the pivot arms 56, 56 intermediate the ends thereof is a bearing means in the form of an angle iron 64 having the ends of each leg welded or otherwise fixed to the pivot arms so that the intersection of the legs points toward the switch 46. Extending between the angle iron 64 and the bottom wall of the feed table 28 are a pair of spring members 66, 66 that bias the angle iron pivot arms 56, 56 and actuating bar 54 to the position illustrated in solid lines in FIG. 4. At a point aligned with the switch 46, the intersection of the legs of the angle iron 64 is formed with an opening in which is slidably received the actuating rod 48. Adjacent the opening in the angle iron 64 the actuating rod 48 fixedly carries a washer assembly 70 which bears on the intersection of the legs of the angle iron; adjacent the other end of the actuating rod 48 is a guide member 72 depending from the bottom wall of the feed table 24 which receives and guides the actuating rod. The end of the actuating rod adjacent the switch 46 is formed with a bearing surface 74 adapted to engage a plunger on the switch to close the electrical circuit noted above.

To close the switch 46, the operating assembly 50 is moved to the dotted line position illustrated in FIG. 4 of the drawing by pressing the actuating bar 54 in a clockwise direction against the force of the spring member 66, 66 causing the arms 56, 56 and the angle iron 64 to pivot about the hinge pins 60, 60. Movement of the angle iron 64 exerts force on the washer 70 causing rod 48 to slide axially whereby the bearing surface 74 of the actuating rod engages the switch 46 and actuates the electrical current. To prevent the angle iron from binding on the actuating rod due to its arcuate movement, the opening in the angle iron is oversized relative to the diameter of the actuating rod.

The second operating arm assembly 52 includes a generally U-shaped member 78 the cross leg of which extends under the bottom wall of the feed table 28 and which is welded to a pair of hinge plates 80, 80 each pivoted about a hinge pin 82. Similar to the hinge pins 60, 60, hinge pins 82, 82 are associated with another pair of hingeplates 84, 84 welded to the bottom wall of the feed table 28. The parallel legs of the U-shaped cross member 78 extend upwardly from the cross leg and parallel to the side walls of the feed table 28. Preferably, the ends of the parallel legs are formed with handles 86, 86 so that when the handles are pushed counter-clockwise as viewed in FIG. 3 of the drawing, the U-shaped member 78 and hinge plates 80, 80 pivot in the same direction about the hinge pins 82, 82. A spring 87 connected between each of the extending legs of the U-shaped member and the feed table biases the U-shaped member 78 to the solid line position illustrated in FIG. 3 of the drawing.

Extending from the cross-leg of the U-shaped member 78 and generally parallel and overlying the plunger rod 48 is a bearing plate 88 in overlying bearing relationship with a first leg 90 of another bearing plate formed with a second leg 92 extending at a right angle to the first leg. Adjacent the intersection with leg 90, the leg 92 is welded or otherwise secured to a hinge plate 94 pivoted about a hinge pin 96 associated with another hinge plate 98 welded to the bottom of the feed table 28; adjacent its free end, the leg 92 is formed with an opening which is oversized relative to the plunger rod 48 and which slidably receives the plunger rod. Rigidly fixed to the plunger rod 46 is a washer 100 which is in bearing engagement with the second leg 92 of the bearing plate.

To close the switch 46, the operating assembly 52 is moved to the dotted line position illustrated in FIG. 3 of the drawing by pushing on either handle 86 in a counter-clockwise direction against the force of the springs 87, 87 causing the U-shaped member 78, hinge plate 80 and bearing plate 88 to pivot about the hinge-pins 82, 82. In turn, the bearing plate 88 pivots the first leg 90 and second leg 92 of the bearing plate member in a clockwise direction about the hinge pin 90. Movement of the second leg 92 exerts a force on the washer 100 causing the actuating rod 48 to slide axially whereby the bearing surface 74 of the actuating rod engages the switch 46 and activates the electrical circuit. To prevent the second leg 92 from binding on the plunger rod due to its arcuate movement, the opening in the second leg is oversized relative to the diameter of the plunger rod as noted previously.

It can be seen from the above description of the actuating means that an operator may push on the actuator bar 54 anywhere along its length or on either of the handles 86, 86, to actuate the electrical circuit. It can also be seen from the above description, that either of the operating assemblies 50 and 52 can be utilized independent of the other. That is, use of the actuating bar 54 slides the actuating rod 48 through the opening in the second leg 92 of the bearing plate member without co-acting with the actuating assembly 52 and use of handles 86 forces the plunger rod through opening in the angle iron 64 without co-acting with the operating assembly 50. When the switch 46 is closed, as noted previously, both a shutoff means and an emergency brake means are actuated simultaneously. The shutoff means includes a conventional relay located in a housing means 104 which relay is electrically and conventionally connected to the ignition circuit of the gasoline engine 14. When the relay is energized, the ignition circuit is open causing the power supply 14 to discontinue its output to the brush chipper 10.

Figure 6:
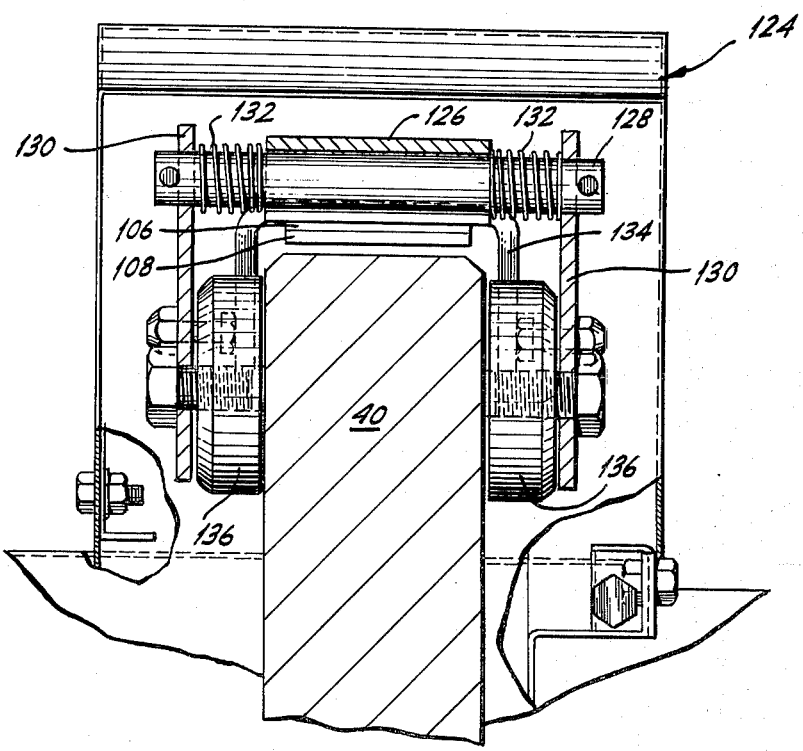

While the emergency brake means may take various forms, the preferred embodiment of the invention described herein includes a brake means most clearly illustrated in FIGS. 5 and 6 of the drawing and while the following description of the brake means relates to its utilization in a brush chipper, it should be specifically understood that the brake means is usable with various other apparatus. The brake means includes a generally circular outer brake band 106 and an inner brake lining 108 both of which extend about a substantial portion of the outer periphery of the flywheel 40. The flywheel 40 is utilized for convenience since it does not include any projecting members such as cutting blades which are carried on the rotating drum of a brush chipper; however, it should be understood that a smooth surface could be provided about the drum member 24 and that the brake band 106 and brake lining 108 could extend thereabout. Both the brake band member 106 and the brake lining 108 terminate in spaced apart end portions and one end portion is formed with an outwardly extending leg 110 which is fixed to an angle iron 112 by a conventional clamp plate assembly 114 and suitable fasteners. The angle iron 112 is secured to the top of the feed chute 26 and extends across a cutout portion of the flywheel housing adjacent the periphery of the flywheel 40. The other end of the brake band is formed with an up-standing ear 116 carrying an internally threaded member 118 which is rotatably carried by the ear and which receives an externally threaded stud member 120. One end of the stud member 120 is pivotally carried by the clamp plate assembly 114. Intermediate its ends, the stud member 120 fixedly carries a washer in bearing engagement with a shoulder formed thereon and which engages one end of a spring 122. The other end of the spring 122 bears on the adjacent surface of the internally threaded member 118 and, thus, the spring exerts a force on the brake band 106 which spaces the end portions apart and biases the brake lining 108 out of engagement with the flywheel 40. By rotating the internally threaded member 118, the compression of the spring 122 is varied to adjust the spring force exerted on the brake band 106.

At this point it is noted that the cutout portion of the flywheel housing is enclosed in a rectangular housing member 124. Within the housing member 124, a pair of journal members 126, 126 are welded or are otherwise secured to the outer surface of the brake band 106. Each journal member 126 carries a pivot pin 128 having end portions extending beyond the ends of the journal member. The end portions of the pivot pins 128, 128 carry trapezoidally shaped mounting plates 130, 130. As best seen in FIG. 6 of the drawing, the mounting plates 130, 130 extend adjacent and parallel to the end faces of flywheel 40 and are spaced therefrom by centering springs 132. A yoke member 134 is also located between the mounting plates 130 and comprises a generally U-shaped member, the cross leg of which extends across the outer surface of the brake band 106 and the extending legs of which extend parallel to the mounting plates 130 and adjacent thereto. Screw members extend through the mounting plates 130 and have heads bearing on the extending legs of the yoke member 134. The screws cooperate with nut members to locate the yoke member 134 and hold it in position. Each mounting plate 130 carries a pair of electromagnets 136, 136 such that the electromagnets are adjacent the end faces of the flywheel 40 and are slightly spaced therefrom. The electromagnets 136, 136 are connected in the electrical circuit with the switch 46 and the shutoff means. When energized, the electromagnets grip end faces of the flywheel 40 and, as will be made clear hereinafter, cause the brake lining 108 to wrap about the periphery of the flywheel 40 and apply a braking force.

When the brush chipper 10 is operational, the power supply 14 drives the shaft on which the drum is mounted through the sheave and drive belt. As the shaft rotates, the drum member 24, flywheel 40 and the impeller (not shown) also rotate so that as the rotary drum member rotates, it passes through the cutting station where the cutting blades 25 cooperate with the cutter bar to cut brush and similar debris fed through the feed chute 26. Feeding of the brush is accomplished by an operator standing adjacent the end of the feed table 28 who places the brush on the feed table and pushes it through the chute 26 to the cutting station. If during the operation of the brush chipper 10, the operator detects a foreign object being fed to the cutting station that could cause damage to the brush chipper, he depresses either the actuating bar 54 at any point along its length or either handle 86, depending on the most accessible of these devices and as previously explained, the actuating rod 48 is forced by either of the operating assemblies 50 or 52 into engagement with the switch 46 to actuate the electrical circuit. When the electrical circuit is actuated, the relay in the housing 104 disconnects the ignition circuit in the power supply 14 stopping its output to the shaft on which the drum member is mounted and also energizes the electromagnets 136 to stop the rotation of the drum member 24.

When the magnets 136 are energized, as noted previously, they grip the end faces of the flywheel 40. As the flywheel 40 rotates, the magnets 136 rotate with it and pull the mounting plates 130, the pivot pins 128 and the journals 126. Movement of the journals 126 causes the brake band member 106 and the brake lining 108 to wrap about the periphery of the flywheel and exert a braking force thereon. Since the drum member 24 and the flywheel 40 are the source of energy for the braking force it should be realized that the faster the drum member rotates the larger the braking force applied and the quicker it is applied.

In view of the foregoing, it can be seen that a brush chipper has been provided that includes a stopping arrangement which is operable from various easily accessible positions adjacent an operators station. In addition, it can be seen that there has been provided a brake means that is relatively simple and that provides large braking forces over a short period of time that varies with the rotation of the drum member.

While in the foregoing, a preferred embodiment of the invention has been disclosed, it should be obvious to one skilled in the art that various modifications and changes may be made without departing from the true spirit and scope of the invention as recited in the appended claims.

I claim:

1. A brush chipper or the like comprising power means operatively associated with a rotatable drum assembly for rotating said drum assembly about its axis, said drum assembly including cutting means rotatable therewith for cutting brush and similar material, a feed station adjacent said drum assembly from which brush and similar material may be fed to said drum assembly, emergency shutoff means associated with said power means for discontinuing the output of said power means to said drum assembly and emergency brake means associated with said drum assembly for stopping the rotation thereof, said emergency shutoff means and said emergency brake means being energized simultaneously by actuating means located adjacent said feed station, said actuating means including a plurality of operating means, each of said operating means being operative independent of the other to actuate said emergency shutoff means and said emergency brake means, said actuating means further including an actuating rod slidable from a first position to a second position for operating switch means connected with said emergency shutoff means and said emergency brake means, each of said operating means being arranged to slide said actuating rod from said first position to said second position without causing movement of the other said operating means.

2. A brush chipper or the like in accordance with claim 1 wherein one of said operating means includes an actuator bar extending across the end of said feed station and being connected to pivot arms pivotally mounted at one end to a portion of said feed station, first bearing means extending between said pivot arms and being located adjacent second bearing means fixed to said actuating rod whereby when a force is applied to said actuator bar, said pivot arms pivot and said first bearing means cooperates with said second bearing means to slide said actuating rod from said first position to said second position.

3. A brush chipper or the like in accordance with claim 1 wherein another of said operating means includes a generally U-shaped member having a cross-leg pivotally mounted adjacent said feed station and further having a pair of leg portions extending from said cross-leg at spaced apart positions adjacent said feed station, pivoted bearing means connected between said cross-leg and another bearing means on said actuating rod whereby when a force is applied to either of said leg portions, said cross-leg pivots and said pivoted bearing means and said another bearing means cooperate to slide said actuating rod from said first position to said second position.

4. A brush chipper or the like in accordance with claim 1 wherein one of said operating means includes a generally U-shaped member having a cross-leg pivotally mounted adjacent said feed station and further having a pair of leg portions extending from said cross-leg at spaced apart positions adjacent said feed station, third bearing means pivotally mounted to a portion of said feed station and being operatively engaged with said cross-leg and fourth bearing means, said fourth bearing means being located on said actuating rod whereby when a force is applied to either of said leg portions, said cross-leg pivots said third bearing means which moves said fourth bearing means to slide said actuating rod from said first position to said second position.

5. A brush chipper or the like in accordance with claim 1 wherein said drum assembly includes a portion having a smooth outer periphery and a pair of end faces, and wherein said emergency brake means includes a brake band member and a brake lining extending about said portion of said drum assembly having a smooth outer periphery, said brake band member having a first end portion rigidly connected to a frame member and a second end portion cooperating with spring means to bias said second end portion away from said portion of said drum assembly, gripping means carried by said second end portion being located adjacent said end faces of said drum assembly, said gripping means having a first position spaced from said end faces and being movable to a second position wherein it grips said end faces when energized by said actuating means whereby the energy in said drum assembly causes said brake lining to wrap around said smooth outer periphery of said portion of said drum assembly and exert a braking force thereon.

6. A brush chipper or the like in accordance with claim 5 wherein said gripping means includes electromagnets which are energized when said actuating rod is in said second position.

7. A brake assembly for a rotating drum member comprising a generally circular brake band member and a brake lining for extending about a smooth outer portion of said drum member, said brake band member having a first end portion including means for rigidly connecting said first end portion to a frame member, a second end portion cooperating with spring means to bias said second end portion away from said first end portion, gripping means carried by said second end portion and being located radially inwardly of said brake band member whereby said gripping means is adapted to be spaced from the end face of said drum member, said gripping means being movable to a position wherein it is adapted to grip said end face of said drum member whereby the energy in said member causes said brake lining to wrap around said smooth outer portion of said drum member and exert a braking force thereon.

8. A brake assembly for a rotating drum in accordance with claim 7 wherein said gripping means comprises electromagnet means.

9. A brake assembly for a rotating drum in accordance with claim 8 wherein said second end portion includes a rotatable internally threaded member and wherein said first end portion carries a pivotally mounted stud member adapted to be received in said internally threaded member, said spring means bearing on said internally threaded member and on a bearing surface on said stud member whereby said spring means biases said first and second end portions apart and whereby said spring biasing force can be adjusted by rotating said internally threaded member.

10. A brake assembly for a rotating drum in accordance with claim 8 wherein said second end portion carries a pair of mounting plates each extending radially inwardly of said brake band member whereby said plate members are adjacent said drum member and wherein each of said mounting plates carries at least one electromagnet.

11. A brake assembly for a rotating drum in accordance with claim 10 wherein said mounting plates are coupled to said brake band member for movement therewith.

12. A brake assembly for a rotating drum in accordance with claim 10 wherein a yoke member is provided between said mounting plates for rigidly maintaining the spacing therebetween.

13. A brake assembly for a rotating drum member comprising a brake band member and a brake lining adapted to extend about a portion of the periphery of said drum member, said brake band member having a first end portion adapted to be rigidly connected to a frame member and a second end portion cooperating with spring means to bias said second end portion away from said first end portion, gripping means including electromagnet means carried by said second end portion and being adapted to be spaced from said drum member, said gripping means being movable to a position wherein it is adapted to grip said drum member whereby the energy in said drum member causes said brake lining to wrap around said drum member and exert a braking force thereon, said second end portion including a rotatable internally threaded member said first end portion carrying a pivotally mounted stud member adapted to be received in said internally threaded member, and said spring means bearing on said internally threaded member and on a bearing surface on said stud member whereby said spring means biases said first and second end portions apart and whereby said spring biasing force can be adjusted by rotating said internally threaded member.

14. A brake assembly for a rotating drum member comprising a brake band member and a brake lining adapted to extend about a portion of the periphery of said drum member, said brake band member having a first end portion adapted to be rigidly connected to a frame member and a second end portion cooperating with spring means to bias said second end portion away from said first end portion, said second end portion carrying a pair of mounting plates each extending radially inwardly of said brake band member whereby said plate members are adjacent said drum member, gripping means including electromagnet means carried by said mounting plates and being adapted to be spaced from said drum member, said gripping means being movable to a position wherein it is adapted to grip said drum member whereby the energy in said drum member causes said brake lining to wrap around said drum member and exert a braking force thereon.

15. A brake assembly for rotating drum in accordance with claim 14 wherein said mounting plates are coupled to said brake band member for movement therewith.

16. A brake assembly for rotating drum in accordance with claim 14 wherein a yoke member is provided between said mounting plates for rigidly maintaining the spacing therebetween.

* * * * *